United States Patent [19]

Herten et al.

[11] Patent Number: 4,853,427
[45] Date of Patent: Aug. 1, 1989

[54] COMPOSITION AND METHOD TO PROCESS POLYMERS INCLUDING ULTRAHIGH MOLECULAR WEIGHT POLYETHYLENE

[75] Inventors: Joris F. Herten; Bernard D. Louies, both of Brussels, Belgium

[73] Assignee: Allied-Signal Inc., Morris Township, Morris County, N.J.

[21] Appl. No.: 909,157

[22] Filed: Sep. 19, 1986

Related U.S. Application Data

[63] Continuation-in-part of Ser. No. 621,295, Jun. 15, 1984, abandoned.

[51] Int. Cl.$^4$ .............................................. C08K 5/09
[52] U.S. Cl. ................................... 524/394; 264/171; 525/221
[58] Field of Search ................... 525/221; 524/394

[56] References Cited

U.S. PATENT DOCUMENTS

| 3,657,114 | 4/1972 | Smith. | |
|---|---|---|---|
| 3,959,539 | 5/1976 | Waggoner. | |
| 3,974,114 | 8/1976 | Sowa. | |
| 4,010,127 | 3/1977 | Taka et al.. | |
| 4,306,172 | 1/1982 | Albee et al. | 525/221 |
| 4,331,779 | 5/1982 | Park. | |
| 4,381,376 | 4/1983 | Albee et al. | 525/221 |
| 4,412,040 | 10/1983 | Albee et al. | 525/221 |
| 4,420,580 | 12/1983 | Herman et al. | 525/221 |
| 4,440,908 | 4/1984 | McClain. | |
| 4,454,281 | 6/1984 | Heitz et al.. | |

Primary Examiner—Jacob Ziegler
Attorney, Agent, or Firm—Patrick L. Henry; Anthony J. Stewart

[57] ABSTRACT

The present invention is a composition and method to process an ultrahigh molecular weight polymer, preferably a vinylic polymer, from about 0.1 to about 25 percent by weight based on the weight of the polymer of a material containing more than one acid group, and from about 0.01 to about 2.5 percent by weight based on the weight of the polymer of a polyfunctional Lewis base.

16 Claims, No Drawings

COMPOSITION AND METHOD TO PROCESS POLYMERS INCLUDING ULTRAHIGH MOLECULAR WEIGHT POLYETHYLENE

This application is a continuation-in-part of Ser. No. 621,295 filed June 15, 1984, now abandoned.

BACKGROUND OF THE INVENTION

This invention is in the field of polymer compositions, and processes; more particularly, the invention relates to ultrahigh molecular weight polymer compositions, particularly ultrahigh molecular weight polyethylene compositions, and methods of melt processing such as continuously forcing the composition through an aperture such as by extrusion.

Ultrahigh molecular weight polyethylene is described as high density polyethylene with an extremely high molecular weight in the range of two to six million, by Hug D. P., "UHMW polyethylene", *Modern Plastics Encyclopedia*, 1979-80, Vol. 56, No. 10A, pp. 74-76 published by McGraw-Hill and hereby incorporated by reference. It is noted in this article that ultrahigh molecular weight polyethylene cannot be processed by conventional plastic processing techniques. The long chain molecules do not melt or flow in a normal thermoplastic manner.

The Hug article notes that a method has been developed to inject mold ultrahigh molecular weight polyethylene in a specially designed machine which is a modification of a standard scew-injection molding machine. Other new processes have been disclosed by which special equipment can be used to process ultrahigh polyethylene.

As indicated in the Hug article there are a variety of known ultrahigh molecular weight compositions. Filler and polymer modifiers can be added to enhance certain properties.

U.S. Pat. No. 4,420,580 discloses that the detrimental effect of inorganic metal fillers on the impact strength of polyolefin resins is reduced by the addition of a copolymer of ethylene and an alpha,beta-ethylenically unsaturated carboxylic acid, such as ethylene acrylic acid, to a melt blend of polyolefin resin containing the inorganic filler. The ethylene copolymer is added to compatibilize or couple the filler into the polyolefin resin. This disclosure is not directed to ultrahigh molecular weight polymers nor is there a recognition of the use of the inorganic metal filler and acid copolymer to lubricate the polyolefin.

SUMMARY OF THE INVENTION

The present invention is a composition comprising an ultrahigh molecular weight vinylic polymer, from about 0.1 to about 25 percent by weight based on the weight of the polymer of a polymeric material containing more than one acid group and from about 0.01 to about 2.5 percent by weight based on the weight of the polymer of a polyfunctional carboxylic acid salt.

A particularly preferred embodiment of the present invention is an ultrahigh molecular weight polyethylene composition having from about 0.1 to about 25%, and preferably 0.1 to 10% by weight of the ultrahigh molecular weight polyethylene of a polymeric material containing more than one acid group. The composition also contains from about 0.01 to about 2.5% by weight based on the weight of the ultrahigh molecular weight polyethylene of a polyfunctional carboxylic acid salt. While greater amounts of the carboxylic acid salt may be used, the benefits of increasing the amount are insignificant and in fact, may serve to deteriorate the properties of the ultrahigh molecular weight polymer.

Preferred polymers containing more than one acid group include polymers such as the copolymer of alpha-olefin and an alpha,beta-ethylenically unsaturated carboxylic acid having a number average molecular weight of from 500 to 10,000. The polyfunctional carboxylic acid salts preferably have a lower molecular weight than the polymeric material containing more than one acid group.

The method includes melt processing a polymer composition comprising a polymer, preferably an ultrahigh molecular weight polymer, an acid containing polymeric material such as the copolymer of an alpha-olefin and an alpha, beta ethylenically unsaturated carboxylic acid having a number average molecular weight of from 500 to 10,000, and a polyfunctional carboxylic acid salt. The method of the present invention can include the step of continuously forcing the polymer, preferably ultrahigh molecular weight polyethylene, composition through an aperture. The composition can be continuously extruded using conventional thermoplastic melt processing extrusion equipment.

DESCRIPTION OF THE PREFERRED EMBODIMENTS

The present invention is a composition comprising an ultrahigh molecular weight vinylic polymer, from about 0.1 to about 25 percent by weight based on the weight of the polymer of a polymeric material containing more than one acid group, and from about 0.01 to about 2.5 percent by weight based on the weight of the polymer of a polyfunctional carboxylic acid salt. By more than one acid group, it is meant that the acid containing material has molecules containing at least two acid groups. By polyfunctional carboxylic acid salt, it is meant that the base carboxylic acid has at least two acid groups.

A particular preferred embodiment of the present invention is a composition comprising ultrahigh molecular weight polyethylene and from about 0.1 to about 25, preferably 0.1 to 10, and more preferably 0.5 to about 5% by weight based on the weight of the ultrahigh molecular weight polyethylene of a polymeric material containing more than one acid group. The composition contains from about 0.01 to about 2.5% and preferably 0.1 to 1.5% by weight of a carboxylic acid salt.

Polymers which are useful in the composition and method of the present invention are vinylic polymers. For the purpose of the present invention vinylic polymers are polymers produced by the polymerization of monomers containing the repeating unit $R_2C=CR_2$ wherein each of the R's can be the same or different. Preferred R's can include but are not limited to the following radicals: hydrogen, alkyl, allyl, aryl, and halides including bromides, chlorides and fluorides. Useful polymers are polyolefins such as polypropylene and polyethylene, polystyrene, polyvinyl chloride, chlorotrifluoroethylene copolymer, tetrafluoroethylene copolymers, and ABS (copolymers of acrylonitrile, butadiene, and styrene). The polymers can be copolymers. The method of the present invention is particularly useful where the polymer is an ultrahigh molecular weight polyolefin such as polyethylene or polypropylene.

The ultrahigh molecular weight polymer, preferably polyethylene, useful in the composition of the present invention preferably have a weight average molecular weight in the range of about five hundred thousand to about six million, preferably from one million to about five million, and more preferably two millon to five million. Ultrahigh molecular weight polyethylene can be produced by a modified Ziegler system similar to that used to produce conventional high density polyethylene. The polymer is considered a thermoplastic although melt processing is difficult. The ultrahigh molecular weight polyethylene is typically supplied as a fine powder.

The preferred polymers having more than one acid group include the copolymers of an alpha-olefin and an alpha,beta-ethylenically unsaturated carboxylic acid having a number average molecular weight from about 500 to about 10,000 and preferably from 1,000 to 5,000, and most preferably 1,000 to 3,500. The polymer containing more than one acid groups preferably has a Brookfield viscosity at 150 C of up to 30,000 centipoises with the preferred viscosity being from 100 centipoises to 10,000 and most preferably 150 to 800 centipoises.

The alpha,beta-ethylenically unsaturated carboxylic acids which can be copolymerized with the alpha-olefin preferably have 3 to 8 carbon atoms. Examples of such acids, include acrylic acid, methacrylic acid, ethacrylic acid, itaconic acid, maleic acid, fumaric acid and monoesters of other dicarboxylic acids, such as methyl hydrogen maleate, methyl hydrogen fumarate, ethyl hydrogen fumarate, and maleic anhydride, which is considered to behave like an acid and be an acid in the present invention.

The alpha-olefin is preferably ethylene. The concentration of the ethylene in the copolymer is at least 50 mol percent, and preferably above 80 mol percent.

A preferred copolymer acid is a copolymer of ethylene and acrylic acid. The ethylene acrylic acid copolymer has an acid number in the range from about 1 to about 180, with an acid number from about 40 to 160 being preferred, and an acid number from about 40 to 120 being most preferred. The acid number is determined by the number of milligrams of potassium hydroxide necessary to neutralize one gram of acid. The average number molecular weight is from about 500 to about 10,000 preferably from 1,000 to 5,000, and more preferably from 1,000 to 3,500. Table I below characterizes preferred ethylene acrylic acid copolymers.

aluminum, with aluminum, zinc and calcium being more preferred, and aluminum, in that order, and zinc being the most preferred metal salts. The preferred carboxylic acid salt is a fatty acid based material such as stearic acid. It is preferred that the salt have a lower molecular weight than the acid.

The composition of the present invention can contain conventional additives useful in ultrahigh molecular weight polymeric compositions. Such additives are discussed in the above references article by Hug. Typically, such compositions can include but are not limited to a variety of fillers and polymer modifiers. Included in these materials is graphite, fibers, talc, powdered metals, glass fibers and beads. Other materials such as thermal stabilizers, antioxidants, flame retardants, anti-static agents, and colorents including pigments and dyes can be added.

The method of the present invention comprises the step of melt processing the above described ultrahigh molecular weight polymer composition. For the purposes of the present invention, melt processing is defined as a method used to deform a thermoplastic polymer above its melting point. Typically, melt processing is used to convert the polymer from one shape to another, or to blend or mix other materials with the polymer. Nonlimiting examples of melt processing methods in the definition of melt processing include: molding such as blow molding and injection molding, stamping, calendering, compression molding, extrusion, mixing, roll processing and the like. The method includes the forming of molded articles, sheets, films and fibers.

The present invention includes a method of continuously forcing the ultrahigh molecular weight polymer composition of the present invention through an aperture. The polymer is preferably at temperatures above its melting point. For the purposes of the present invention, the aperture can be the outlet of an extruder and in particular an extruder die or an injection mold, the gap of mixing rolls and the like where shearing is likely to be encountered. The composition undergoes shear as it passes through the aperture, and can also undergo shearing in a means which continuously forces the composition through an aperture such as an extruder.

The method of the present invention has been found to be particularly useful where the polymer composition is a ultrahigh molecular weight polyethylene composition. This composition can be melt processed using conventional melt processing equipment which is gen-

TABLE I

| Co polymer Acid | Softening Pt. (ASTM E-28) C. | Softening Pt. (ASTM E-28) F. | Hardness dmm (ASTM D-5) | Density g/cc (ASTM D-1505) | Brookfield Viscosity @ 140 C. cps | Acid No mg KOH/g | Wt. % Acrylic Acid |
|---|---|---|---|---|---|---|---|
| A | 108 | 226 | 2.0 | 0.93 | 500 | 40 | 5 |
| B | 102 | 215 | 4.0 | 0.93 | 650 | 80 | 8 |
| C | 92 | 198 | 11.5 | 0.93 | 650 | 120 | 15 |

The low molecular copolymer acids of the present invention can be prepared by a suitable process known in the art. An example method is described in U.S. Pat. No. 3,658,741, which is incorporated herein by reference.

The polyfunctional carboxylic acid salt is preferably the metallic salts of carboxylic acids or anhydrides. A preferred carboxylic acid salt is selected from the metalic salts of fatty acids and are preferably Group II and III metal salts of fatty acids. Preferred metals include magnesium, calcium, barium, zinc, cerium (II), and erally useful to melt process thermoplastics. As indicated in the Background of the Invention and in the Hug article, heretofore ultrahigh molecular weight polyethylene resin could not be processed by conventional plastic processing techniques. Special designed machinery must be used. The composition of the present invention can be processed on conventional thermoplastic processing equipment. In particular the composition can be continuously forced through an aperture such as by continuously being extruded. The composition can be extruded by any number of methods including extrusion by screw methods for injection molding or through a die. The ultra high molecular weight polyethylene can be extruded through a single screw extruder.

The composition can be melt processed at from 135° C. to about 450° C., preferably 150° C. to about 300° C., and more preferably 170° C. to about 240° C. The composition can be processed in an extruder at pressures of from about 10 kg/cm² to 600 kg/cm². Extrusion pressure depends in part upon the size of the aperture or die through which the extruded material is passing. A preferred extrusion pressure range is from about 100 to about 400 kg/cm².

It has been found that the composition of the present invention is preferably premixed to form a uniform mixture of the polymer, preferably ultrahigh molecular weight polyethylene, composition, the polymeric material containing more than one acid group material and the polyfunctional carboxylic acid salt. The materials should be premixed under conditions so that a uniform mixture is formed with a minimum of reaction between the acid containing material and the carboxylic acid salt. The premixing can take place by physically mixing the materials below the polymer melting point.

It has been found that the composition performs best when the component materials including the polymer, such as ultra high molecular weight polyethylene, the polymeric acid containing material, such as a copolymer of ethylene and acrylic acid, and a dicarboxylic acid salt, such as aluminum stearate, are uniformly mixed at about the temperature either of the melting point of the acid or the melting point of the base. Premixing is preferably conducted in a shear type mixer where the temperature increases with time. The composition performs best when the mixture is conducted up to either about the melting temperature of the acid or up to about the melting temperature of the salt.

It is preferred to premix the materials at a temperature just above the melting point of the acid containing polymeric material. In this way the salt and the polymer in powder form can form a homogeneous mixture with the acid containing polymeric material. The particles of the ultrahigh molecular weight polyethylene are coated by the polymeric acid containing material and the carboxylic acid salt.

It is believed that during the melt processing of the compositation of the present invention there is some neutralization of the acid containing polymeric material by the carboxylic acid salt which results in a certain amount of ionic crosslinking. It is thought that this ionic crosslinked material acts as both an internal lubricant and an external lubricant to enable the composition to be melt processed in conventional thermoplastic melt processing equipment. In the preferred composition and process where the composition comprises an ultrahigh molecular weight polyethylene, an ethylene and carboxylic acid copolymer and a lower molecular weight carboxylic acid salt, it is believed that during melt processing the acid goes to the surface and is continually neutralized by the salt to form an ionomer at or near the surface of the ultrahigh molecular weight polyethylene and this ionomer acts as the lubricant. The lubricant is continually forming during processing.

It has been found that processing aids can added to the composition prior to melt blending to enable the powder to flow more freely into the hopper. A particularly preferred processing aid is oxidized polyethylene.

Preferred oxidized polyethylene found useful in the composition of the present invention is oxidized polyethylene having a number average molecular weight of from 500 to 20,000, preferably 1,000 to 8,000 and more preferably from 1,000 to 5,000 and an acid number of from 10 to 40, and preferably 15 to 30, mg of potassium hydroxide required to neutralize one gram of oxidized polyethylene. The oxidized polyethylene can act both as a processing aid and an acid containing material.

The specific gravity of preferred oxidized polyethylene ranges from 0.915 to about 0.99 and preferably 0.97 to 0.99. The oxidized polyethylene can be prepared by methods known in the art. Oxidized polyethylene is useful in the present invention and a typical method is the oxidation of polyethylene in the manner described in the U.S. Pat. Nos. 3,322,711 and 3,129,667 which are hereby incorporated by reference.

For the purpose of the present invention, number average molecular weights are indicated as measured by a vapor phase osmometer. The procedure which can be used is disclosed in Kaufman and Falcetta, *Introduction to Polymer Science and Technology;* an S.P.E. Textbook pp. 173, 714, Wiley Interscience Publication, 1970 hereby incorporated by reference.

A preferred composition for use in the present invention comprises, in parts by weight, from 85 to 99 parts by weight of ultrahigh molecular weight polyethylene, from 0.5 to 10 parts by weight of a copolymer of ethylene and an alph, beta-ethyleneically unsaturated carboxylic acid having from 3 to 8 carbons and a number average molecular weight of from 500 to 5,000, and a Group II or III, preferably zinc or aluminum, salt of a polyfunctional organic acid, preferably a fatty acid. The preferred method to process this composition is to make a preblend at a temperature up to, between about 40° C. below and about 15° C. above the melting temperature of the copolymer acid but below the melt temperature of the ultrahigh molecular weight polyethylene and of the carboxylic acid salt. For the preferred composition the preblend is made at a temperature from 85° to 100° C. in a water cooled high intensity mixer. The carboxylic acid salt preferably is a finely divided material having a particle size of up to 50 microns, preferably, up to 20 microns. The most preferred salt are zinc stearate, and aluminum stearate, having such a particle size range.

Several examples are set forth below to illustrate the nature of the invention and the manner of carrying it out. However, the invention should not be considered as being limited to the details thereof. All parts are by weight unless otherwise indicated.

EXAMPLES 1-4

Compositions were prepared by blending the components in a high intensity Braun mixer at 125° C. Three grams of each composition were placed on the bottom platen of a hydraulic platen press in a small pile having a diameter of about 4 cm. The press conditions were 190° C. with 88,960N (20,000 pounds force) applied for 10 minutes. The composition flattened to form a "pancake". The diameter of the pancake is an indication of composition flow properties. The greater the diameter, the easier the composition will flow and more likely it will extrude. The pancake procedure is a quick method used to screen a large number of materials. The rate of flow of material using this method is slower than expected using typical melt blending techniques. Results are reproducible but effects of the slow flow rates must be considered.

The ultrahigh molecular weight polyethylene used was HB 301 produced by Hercules, Inc. This material has a weight average molecular weight of about 2,000,000. Additives include zinc stearate having an average particle size of 20 micrometers; and ethylene acrylic acid copolymer, and optionally oxidized polyethylene. The ethylene acrylic acid copolymers included A-C 580 and A-C 5120 produced by Allied Corporation. The A-C 580 had an ASTM E-28 softening point of 102 C; a hardness measured according to ASTM D-5 of 4.0 dmm; a density measured according to ASTM D-1505 of 0.93 g/cc; a Brookfield viscosity @140° C. of 650 centipoises, an acid number of 80 mg KOH required to neutralize 1 gram of the copolymer acid; and 8 weight percent acrylic acid. The A-C 5120 has the following properties measured according to the same test procedures as the A-C 580; a softening point of 92° C.; a hardness of 11.5 dmm; a density of 0.93 g/cc; a visocity of 650 centipoises, an acid number of 120 mg KOH/g copolymer acid, and 15 weight percent acrylic acid. The oxidized polyethylene used was A-C 316 produced by Allied Corporation. The A-C 316 has the following properties measured according to the same test procedures as the A-C 580; a softening point of 140° C.; a hardness of 0.5 dmm; a density of 0.98 g/cc; a Brookfield viscosity at 150° C. of 30,000 centipoises; and acid number of 16 mg KOH/g of oxidized polyethylene.

Results are summarized on the following Table II with the compositions in parts by weight:

TABLE II

|  | Comp 1 | Comp 2 | Ex 1 | Ex 2 | Ex 3 | Ex 4 | Comp 3 | Comp 4 | Comp 5 |
|---|---|---|---|---|---|---|---|---|---|
| HB 301 | 100 | 99.5 | 97.5 | 98.5 | 97.5 | 97.0 | 98 | 97 | 97.5 |
| AC 580 |  |  | 2.0 |  |  |  |  |  |  |
| AC 5120 |  |  |  | 1.0 | 2.0 | 2.0 |  |  | 2 |
| AC 316 |  |  |  |  |  |  | 2 | 1 | 2 |
| Zn St |  | .5 | .5 | .5 | .5 | 1.0 |  |  | .5 |
| Pancake dia(cm) | 11.4 | 11.4 | 13.0 | 12.1 | 14.8 | 13. | 11.5 | 12.3 | 11.3 |

The above results show little or no improvement in flow over Comparative 1 when adding a salt such as zinc stearate alone (Comparative 2) or an acid containing material alone such as oxidized polyethylene (Comparative 3). The addition of the acid copolymer and the zinc stearate improved the pancake flow in each of the Examples 1-4. Of interest was Comparative 4 showing an improvement of flow with only acid containing materials. This is believed to be an aberration in the pancake screening test. As shown in Comparative 6 below using A-C 5120 copolymer acid in a ultrahigh molecular weight polyethylene composition results in improved pancake flow but little improvement in performance using a melt flow index plunger type extruder. It is believed that the A-C 5120 improves the flow at very low flow rates expected upon forming a pancake. Comparative 5 showed no improvement of flow using A-C 316 oxidized polyethylene. The reason for this is not clear. However, the flow has been found to be improved when using A-C 316 and aluminum stearate.

EXAMPLES 5-9

Compositions were prepared by first uniformly mixing them on a Papenmeier 10 liter high intensity (friction or shear) mixer at 1000 rpm until the composition reached the temperature shown in Table III. The compositions were then cooled to room temperature and extruded using a melt flow index plunger type extruder. The melt index machine was manufactured by Davenport as Ser. No. UT 3106. The composition was extruded at 190° C. under a load of 37.19 kg for 30 minutes through a die 3 cm long. The first cm of the die was a cone tapering from 1 cm in diameter to 2 mm in diameter. The second two cms was a cylinder, 2 mm in diameter. The results were measured in gms/30 minutes. Each composition was formed into a 3 gram pancake according to the procedure of Examples 1-4. Results are summarized in the following Table III.

TABLE III

|  | Comp 6 | Ex 5 | Ex 6 | Ex 7 | Ex 8 | Ex 9 |
|---|---|---|---|---|---|---|
| HB 301 | 97.9 | 97.5 | 97.5 | 97.5 | 97.5 | 97.5 |
| A-C 5120 | 2.1 | 2.0 | 2.0 | 2.0 | 2.0 | 2.0 |
| Zn St |  | .5 | .5 | .5 | 5 | .5 |
| Mix to (°C.) | 105 | Rm T (5 min) | 50 | 90 | 115 | 130 |
| Flow g/30 min | 0.01 | 0.02 | 0.39 | .44 | 0.1 | .03 |
| Pancake dia (cm) | 14.5 | 14.28 | 13.9 | 14.0 | 14.3 | 13.9 |

The high pancake result in Comparative 6 does not correlate with the poor flow rate for the reasons discussed with respect to Comparative 4. Otherwise the flow rate improves. It is of interest to note that the best results were obtained at premix to 90° C., slightly below the softening point of A-C 5120 (92° C.).

EXAMPLE 10-14

Examples 5-9 were repeated except that the 97.25 parts HB-301 and 2 parts A-C 5120 were premixed to 105° C. followed by the addition of 0.75 parts of ZnSt and mixed to the temperature shown in Table IV. The flow results are summarized on Table IV.

TABLE IV

|  | Ex. 10 | Ex. 11 | Ex. 12 | Ex. 13 | Ex. 14 |
|---|---|---|---|---|---|
| Mix to (°C.) | 80 | 90 | 100 | 107 | 115 |
| Flow g/30 min | 0.1 | 0.06 | 0.03 | 0.012 | 0.0 |

EXAMPLES 15-16

A composition of 97.5 parts of HB-301, 0.5 parts of zinc stearate, 1 part of A-C 5120, was dry blended (Ex 15). In Example 16, 1.0 part of A-C 316 replaced 1.0 part of HB-301. The A-C 316 was added to help improve flow of the powder into the extruder hopper. The compositions were extruded through a laboratory Model 25D Brabender single screw extruder having a 2 cm long die. The diameter of the die was varied from 3,4 and 8 mm. The extruder was operated at 2.5 kg m and 10 to 20 rpm. The temperature profile in the extruder was Zone 1-45° C., Zone 2-80° C., Zone 3-260° C. and Die- 270°-275° C. The extrudate in both Examples 15 and 16 was in the form of rods and was satisfactory. It is believed the use of a longer die will enable a reduction in die temperature.

EXAMPLES 17-19

Compositions containing varying amounts of HB-301 ultrahigh molecular weight polyethylene, A-C 5120 ethylene acrylic acid copolymer, and zinc stearate were premixed to 95° C. using the Papenmeier mixer described in Examples 5-9. The compositions were extruded in the same manner as in Examples 15 and 16. The extruder was operated at 10 to 20 rpm. Table V summarizes the com positions and extrusion conditions.

TABLE V

|           | Ex 17 | Ex 18 | Ex 19 |
|-----------|-------|-------|-------|
| HB 301    | 98.5  | 97.5  | 97.5  |
| Zn St     | 0.5   | 0.5   | 0.5   |
| A-C 5120  | 1.0   | 2.0   | 2.0   |
| Extrusion |       |       |       |
| Zone 1 (°C.) | 50 | 45 | 45 |
| Zone 2 (°C.) | 75 | 90 | 90 |
| Zone 3 (°C.) | 225 | 26 | 265 |
| Die (°C.) | 285 | 275 | 275 |
| Die dia (mm) | 4 | 8 | 8 |

The extrusion results in the above examples indicate that melt processing of the compositions can be satisfactorily conducted. The results in Example 17 were very good. Extrusion in Example 1 was possible but a die size has to be optimized. A longer die appears to be required for ultrahigh molecular weight polyethylene as compared to conventional thermoplastic polymers for extrusion through a die. In Example 19 the extrusion was satisfactory. During the evaluation, poor results were found when the composition was not sufficiently premixed.

EXAMPLE 20

A composition containing 96.5 parts by weight of HB-301, 0.5 parts of aluminum (stearate) and 3.0 parts of A-C 5120 was premixed in the Papermeier mixer (see Examples 5-9) to 130° C. The mixture was then granulated using the Brabender extruder (see Examples 15-16) operating at Zone 1-50° C.; one 2-50° C., Zone 3-260° C., and the die at 260°-265° C. and 150 rpm. The extrusion was conducted rapidly to prevent the premix from reacting and crosslinking. The die was 3 mm in diameter and the extrudate which was spongy, swelled to about 4 mm in diameter. The extrudate was granulated so that it could be easily fed to the injection molding machine. The injection molding machine was an Aarburg All Rounder, Injection Molder, Model No. 221-55-250. The mold was a dog biscuit or dumbbell type mold with the bar part being 2 mm×2 mm. The composition was injected into both ends of the dumbbell creating a weld line in the center.

The composition was first run without the mold to see if it would extrude. The injection molder was set to 260° C. and the composition extruded satisfactorily. The mold was attached, the injection molder was set to 200° C., and the mold was at room temperature (25° C.). Dumbbells were satisfactorily molded. The temperature of the injection mold rose to 250° C. due to the shearing. During operation one piece was molded every 20 seconds.

A dumbbell was pulled on an Instron stress strain machine at 5 cm/min resulting in a tensile strength of 350 kg/cm$^2$.

EXAMPLE 21

A composition containing 97.5 parts of ABS, 2.0 parts of A-C 5120, and 0.5 parts of aluminum (stearate)$_3$ was evaluated. The ABS had a melt flow index according to ASTM Test No. 1238 at 230° C. and 3.8 kg of 1.6 g/10 min. and Vicat Softening of 190° C. The composition processed satisfactorily on a two roll lab mill. Sticking was observed at 260° C.

While exemplary embodiment of the invention have been described, the true scope of the invention is to be determined from the following claims:

What is claimed is:

1. A composition comprising: (a) an ultrahigh molecular weight vinylic polymer having a weight average molecular weight of at least 1,000,000, (b) from about 0.1 to about 25 percent by weight based on the weight of the vinylic polymer of a second polymeric material containing more than one acid group, and having a weight average molecular weight of less than 10,000, and (c) from about 0.01 to about 2.5 percent by weight, based on the weight of the vinylic polymer, of a carboxylic acid salt.

2. The composition of claim 1 wherein the second polymeric material is selected from the group consisting of copolymers of alpha-olefins and an alpha, beta-ethylenically unsaturated carboxylic acid, and has a number average molecular weight of from 500 to 10,000.

3. A composition comprising: (a) ultrahigh molecular weight polyethylene having a weight average molecular weight of at least 1,000,000, (b) from about 0.1 to about 25 percent by weight based on the weight of the ultrahigh molecular polyethylene of a second polymeric material containing more than one acid group, and having a weight average molecular weight of less than 10,000 and (c) from about 0.01 to about 2.5 percent by weight, based on the weight of the ultrahigh molecular polyethylene, of a carboxylic acid salt.

4. The composition as recited in claim 3 wherein carboxylic acid salt has a lower molecular weight than the second polymeric material.

5. The composition of claim 3 wherein the ultrahigh molecular weight polyethylene has a weight average molecular weight of from about 1,000,000 to about 5,000,000.

6. The composition of claim 4 wherein the second polymeric material is a copolymer of an alpha-olefin and an alpha, beta-ethylenically unsaturated carboxylic acid, and has a number average molecular weight of from 500 to 10,000.

7. The composition of claim 6 wherein the second polymeric material has a number average molecular weight of from 500 to 5,000.

8. The composition as recited in claim 6 wherein the second polymeric material has a Brookfield viscosity at 150° C. of from 150 to 800 centipoise.

9. The composition of claim 3 wherein the second polymeric material contains at least two carboxylic acid groups.

10. The composition of claim 3 wherein the carboxylic acid salt is selected from the group consisting of Group II and III metal salts and cerium (II) salts.

11. The composition of claim 3 wherein there is from 0.1 to 10 percent of the second polymeric material.

12. The composition of claim 3 wherein the ultrahigh molecular weight polyethylene has a weight average molecular weight of from about 1,000,000 to about 5,000,000, the second polymeric material is ethylene acrylic acid having a number average molecular weight of from 500 to 10,000, and the carboxylic acid salt is selected from the group of zinc stearate, aluminum stearate and calcium stearate.

13. The composition of claim 12 wherein the ethylene acrylic acid has a number average molecular weight from 1,000 to 5,000 and then acid number from about 40 to 120.

14. The composition of claim 13 wherein the stearate is zinc stearate.

15. The composition of claim 14 wherein the stearate is aluminum stearate.

16. The composition of claim 3 in the form of a molded article.

* * * * *